United States Patent

Elsholz et al.

[11] Patent Number: 6,003,273
[45] Date of Patent: Dec. 21, 1999

[54] UTILITIES INFEED PANEL

[75] Inventors: Michael D. Elsholz, Grand Rapids; Robert E. Jeffers, Ada; Karl J. Mead, Grand Rapids, all of Mich.

[73] Assignee: Steelcase Development Inc., Grand Rapids, Mich.

[21] Appl. No.: 09/087,562

[22] Filed: May 29, 1998

[51] Int. Cl.⁶ ...................................... E09C 2/34
[52] U.S. Cl. ............... 52/220.7; 52/220.6; 52/238.1; 52/239; 52/220.1; 174/48; 174/49; 174/72 A
[58] Field of Search ................ 52/200.7, 220.6, 52/220.1, 238.1, 239; 174/48, 49, 72 A

[56] References Cited

U.S. PATENT DOCUMENTS

| | | | |
|---|---|---|---|
| 2,896,009 | 7/1959 | Caveney | 174/72 |
| 3,135,469 | 6/1964 | Hanson | 174/48 X |
| 3,377,756 | 4/1968 | Polhamus . | |
| 3,823,251 | 7/1974 | Heighecker et al. . | |
| 3,831,330 | 8/1974 | Tacke et al. . | |
| 4,015,397 | 4/1977 | Flachbarth et al. . | |
| 4,178,468 | 12/1979 | Jorgensen et al. . | |
| 4,199,206 | 4/1980 | Haworth et al. . | |
| 4,230,900 | 10/1980 | Speet . | |
| 4,252,989 | 2/1981 | Blumenthal . | |
| 4,278,834 | 7/1981 | Boundy | 174/48 |
| 4,338,485 | 7/1982 | Fullenkamp et al. | 174/48 |
| 4,353,411 | 10/1982 | Harter et al. . | |
| 4,373,111 | 2/1983 | Myers et al. . | |
| 4,577,055 | 3/1986 | Wuertz . | |
| 4,716,698 | 1/1988 | Wilson et al. . | |
| 4,902,852 | 2/1990 | Wuertz . | |
| 5,044,135 | 9/1991 | Kroon et al. . | |
| 5,081,809 | 1/1992 | Thompson . | |
| 5,115,377 | 5/1992 | Dransman | 361/426 |
| 5,195,286 | 3/1993 | Delong et al. | 52/220 |
| 5,207,041 | 5/1993 | Wills . | |
| 5,214,890 | 6/1993 | Levitan et al. . | |
| 5,277,005 | 1/1994 | Hellwig et al. | 52/220.1 |
| 5,277,007 | 1/1994 | Hellwig et al. . | |
| 5,326,934 | 7/1994 | LeMaster et al. | 174/59 |
| 5,341,615 | 8/1994 | Hodges et al. . | |
| 5,357,055 | 10/1994 | Sireci . | |
| 5,362,923 | 11/1994 | Newhouse et al. . | |
| 5,394,658 | 3/1995 | Schreiner et al. . | |
| 5,511,349 | 4/1996 | Kelley et al. | 52/287.1 |
| 5,685,113 | 11/1997 | Reuter et al. . | |
| 5,697,193 | 12/1997 | Forslund, III et al. . | |
| 5,778,612 | 7/1998 | Kissinger et al. . | |
| 5,801,921 | 9/1998 | Miller | 361/686 |
| 5,852,904 | 12/1998 | Yu et al. | 52/220.7 |

FOREIGN PATENT DOCUMENTS

| | | | |
|---|---|---|---|
| 476399 | 3/1992 | Australia | 174/48 |

OTHER PUBLICATIONS

Exhibit A is a prior art support used to connect a power pole to a ceiling grid.

*Primary Examiner*—Carl D. Friedman
*Assistant Examiner*—Phi Dieu Tran A
*Attorney, Agent, or Firm*—Price, Heneveld, Cooper, DeWitt & Litton

[57] ABSTRACT

A floor-to-ceiling partition wall system includes a plurality of partition panels, each having panel frames interconnected along opposite side edges thereof. The partition panels have cover panels mounted on opposite side faces thereof to form a partition wall having substantially planar side surfaces. A utilities infeed panel has an infeed panel frame with opposite vertical side edges that are interconnected with side edges of adjacent partition panel frames such that the infeed panel forms an integral portion of the partition wall. The infeed panel frame defines first and second opposite side faces, and a vertically-extending central space connected to an opening in the ceiling. A first cover panel is connected to the first side face. A second cover panel is removably connected to the second side face of the infeed panel frame, and closes off the central space. The second cover panel permits access to the central space for utilities management upon removal of the second cover panel.

40 Claims, 13 Drawing Sheets

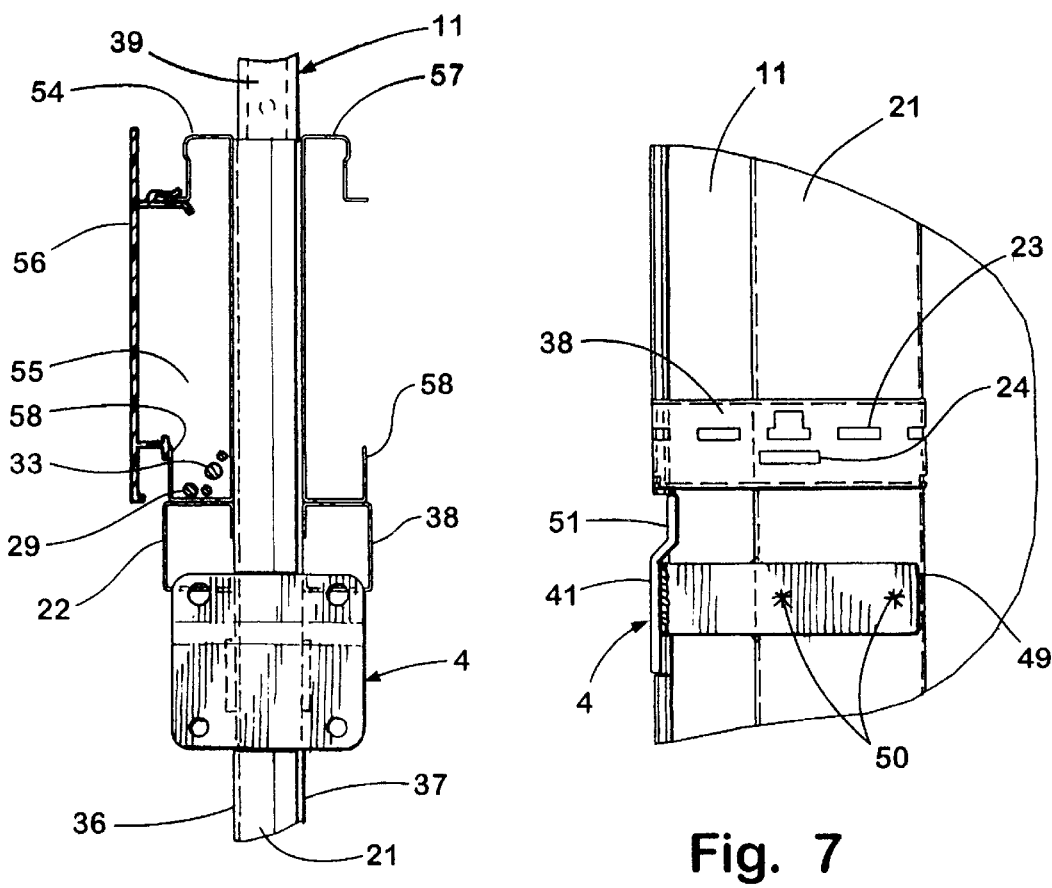
Fig. 9
Fig. 7
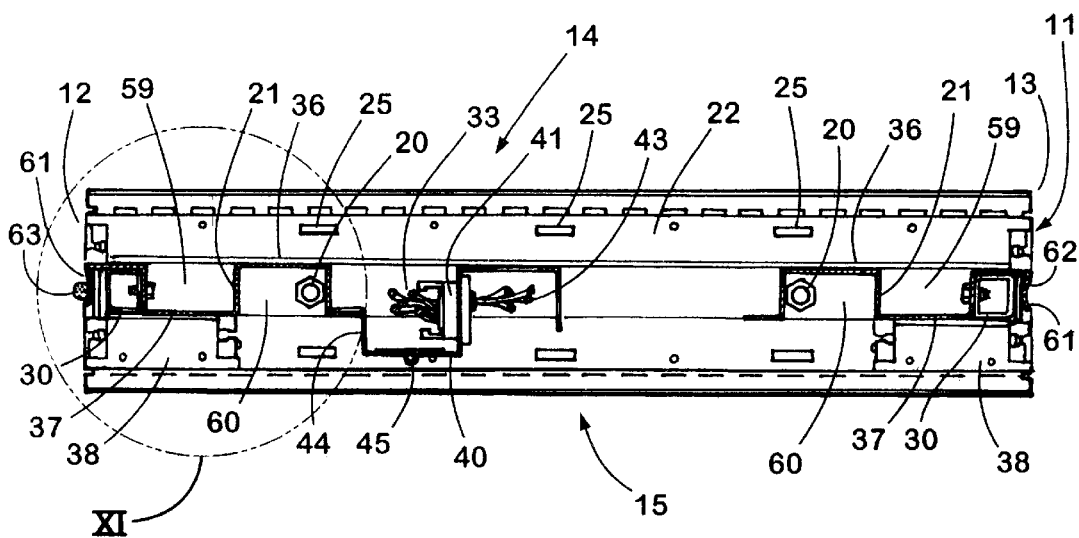
Fig. 10

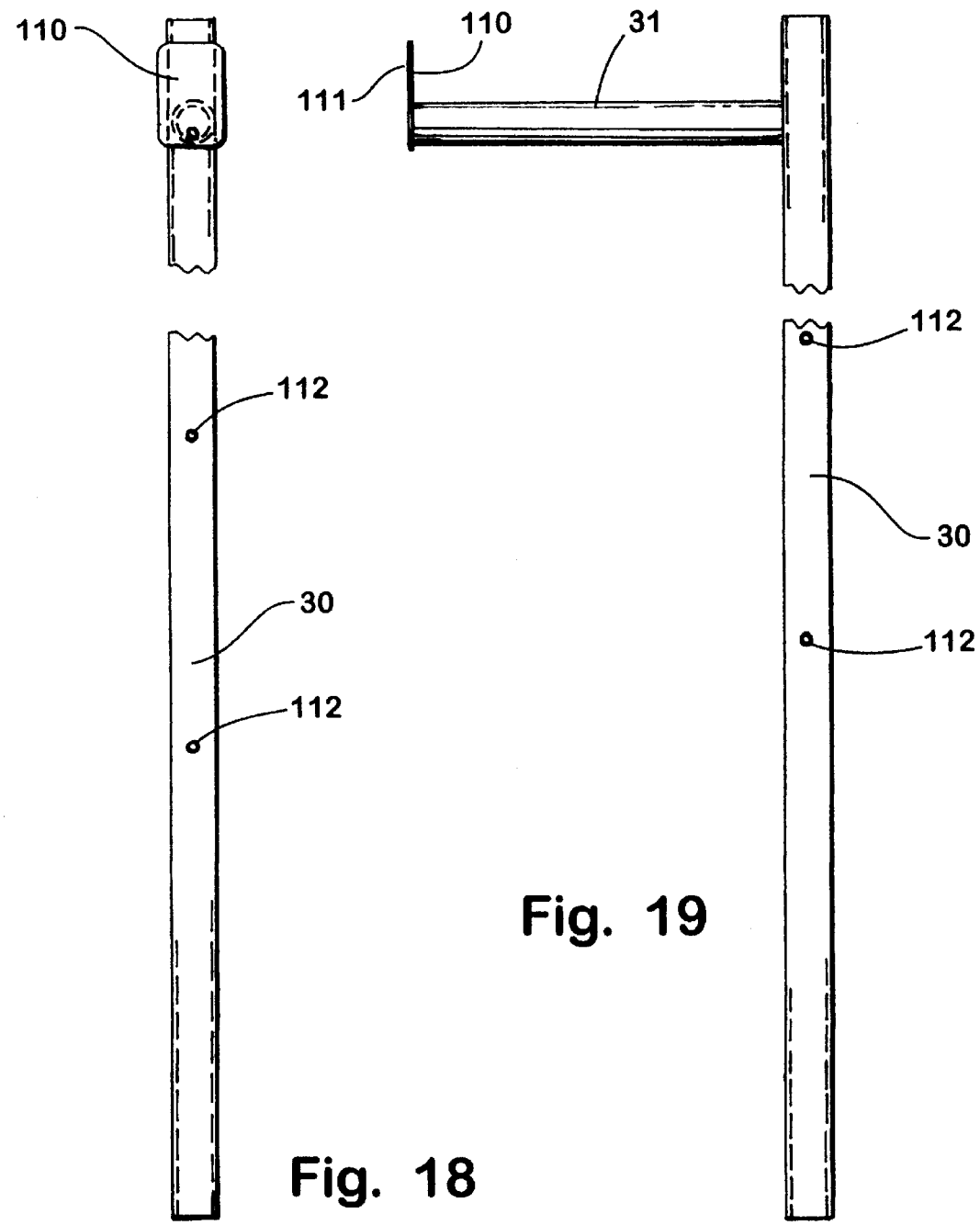

UTILITIES INFEED PANEL

BACKGROUND OF THE INVENTION

The present invention relates to the finishing or fitting-out of building space and the like of the type having a generally open plan interior, and in particular to a utilities infeed panel that forms an integral portion of a prefabricated partition system and provides vertical routing of utilities within the utilities infeed panel through an opening in the ceiling.

The finishing or fitting-out of building spaces for offices, medical treatment facilities, and other areas where work is conducted has become a very important aspect of effective space planning and layout. Work patterns, technology, and business organizations are constantly evolving and changing. The building space users require products which facilitate change at lower cost, yet provide the privacy and aesthetic advantages of permanent floor-to-ceiling architectural wall systems. Space planning is no longer a static problem. Changing technology and changing work processes demand that a design and installation be able to support and anticipate change.

These space planning challenges are driven largely by the fact that modern office spaces are becoming increasingly more complicated and sophisticated due to increasing needs of the users for improved utilities support at each workstation or work setting. These "utilities," as the term is used herein, encompass all types of resources that may be used to support or service a worker, such as communications and data used with computers and other types of data processors, telecommunications, electronic displays, etc., electrical power, conditioned water, and physical accommodations, such as lighting, HVAC, sprinklers, security, sound masking, and the like. For example, modern offices for highly skilled "knowledge workers" such as engineers, accountants, stock brokers, computer programmers, etc., are typically provided with multiple pieces of very specialized computer and communications equipment that are capable of processing information from numerous local and remote data resources to assist in solving complex problems. Such equipment has very stringent power and signal requirements, and must quickly and efficiently interface with related equipment at both adjacent and remote locations. Work areas with readily controllable lighting, HVAC, sound masking, and other physical support systems, are also highly desirable to maximize worker creativity and productivity. Many other types of high technology equipment and facilities are also presently being developed which will need to be accommodated in the work places of the future.

The efficient use of building floor space is also an ever-growing concern, particularly as building costs continue to escalate. Open office plans have been developed to reduce overall office costs, and generally incorporate large, open floor spaces in buildings that are equipped with modular furniture systems, which are readily reconfigurable to accommodate the ever-changing needs of a specific user, as well as the divergent requirements of different tenants. One arrangement commonly used for furniture open plans includes movable partition panels that are detachably interconnected to partition off the open spaces into individual work settings and/or offices. Such partial height partition panels are configured to receive hang-on furniture units, such as worksurfaces, overhead cabinets, shelves, etc., and are generally known in the office furniture industry as "systems furniture." Another arrangement for dividing and/or partitioning open plans involves the use of modular furniture, in which a plurality of differently shaped, complementary freestanding furniture units are positioned in a side-by-side relationship, with upstanding partial height privacy screens available to attach to selected furniture units to create individual, distinct work settings and/or offices. All of these types of modular furniture systems have been widely received due largely to their ability to be readily reconfigured and/or moved to a new site, since they are not part of a permanent leasehold improvement.

In order to gain increased efficiency in the use of expensive office real estate, attempts are now being made to try to support highly paid knowledge workers with these types of modular furniture systems in open office settings, instead of conventional private offices. However, in order to insure peak efficiency of such knowledge workers, the work settings must be equipped with the various state-of-the-art utilities and facilities discussed above. Since such work settings must be readily reconfigurable to effectively meet the ever-changing needs of the users, the distribution and control of utilities throughout a comprehensive open office plan has emerged as a major challenge to the office furniture industry. The inherent nature of modular furniture systems, which permits them to be readily reconfigurable into different arrangements, makes it very difficult to achieve adequate utility distribution and control.

Today's office workers need new flexible alternative products for the creation of individual and collaborative spaces which allow the expression of the cultural aims of the organization, express the creativity of the designer, provide a "sense of place" for the users, and provide a competitive edge for the developer. These needs include a full range of privacy options, from fully enclosed offices which support individual creative work to open spaces for collaborative team work. The products must also be able to accommodate diverse organizations, unique design signatures, and constantly changing work processes. Workers also need effective lighting, better air quality, life safety, and ergonomic task support to promote productivity, minimize the expenses of absenteeism and workman's compensation, and reduce potential liability.

Hence, utility distribution and control are fast becoming one of the major issues in office fit-out and furniture. Changing technology is creating greater demands on power and signal distribution networks. As businesses become more aware of the impact of proper ventilation and climate control on employee health and performance, HVAC is becoming more important as well. The current disposition of HVAC, lighting, and fire protection in the ceiling creates a separation between these services and the work settings below leading to inefficient and inaccurate systems. Routing power and signal distribution below the floor or in furniture systems often ends up in complex idiosyncratic systems which are difficult to manage or change.

Furthermore, due to dimensional variations in existing permanent building walls, ceiling, and floors, space-dividing systems must be adaptable to accommodate these variables. Meeting the varied requirements of office workers within a given facility may require a combination of full and partial height dividers to provide a range of privacy levels corresponding to an individual user's job functions. However, presently available full height architectural walls are not readily reconfigurable, cannot be readily interconnected with partial height dividers, and also do not provide integrated utility distribution between the various types of dividers in the office space.

There is presently an oversupply of office space and furniture systems which do not properly respond to, or support change. Many older buildings do not have adequate utility capabilities, and the cost of conventional renovations or improvements often renders the same impractical. Even relatively new buildings can be quickly rendered obsolete by the fast paced changes in modern technology. The refurbishing of existing building space is therefore a concern which must be addressed by furniture systems.

One type of movable wall which may be used as a part of a solution to those issues noted above is a solid core partition, which has substantial sound transmission resistance. The use of a solid gypsum core provides significant structural and acoustic benefits, at a relatively low cost. However, conventional solid core partitions are typically custom built floor-to-ceiling installations, which do not adequately address the aforementioned concerns of routing utilities through the partition system. The lack of a prefabricated, modular design normally increases costs and installation time. Also, the use of a solid gypsum core, while being acoustically beneficial, inherently provides problems in high tech offices which require substantial power and cable support.

SUMMARY OF THE INVENTION

One aspect of the present invention is to provide a floor-to-ceiling partition wall system or chase, including a plurality of partition panels, each having panel frames interconnected along opposite side edges thereof. The partition panels have cover panels mounted on opposite side faces thereof to form a partition wall having substantially planar side surfaces. A utilities infeed panel has an infeed panel frame with opposite vertical side edges that are interconnected with side edges of adjacent partition panel frames such that the infeed panel forms an integral portion of the partition wall. The infeed panel frame defines first and second opposite side faces, and a vertically-extending central space connected to an opening in the ceiling. A first cover panel is connected to the first side face. A second cover panel is removably connected to the second side face of the infeed panel frame, and closes off the central space. The second cover panel permits access to the central space for utilities management upon removal of the second cover panel.

Another aspect of the present invention is a floor-to-ceiling partition wall of the type having a plurality of partition panels having panel frames interconnected along opposite side edges thereof and cover panels mounted on opposite side faces of the panel frames to form a partition wall having substantially planar side surfaces. The improvement comprises a utilities infeed panel with an infeed panel frame having opposite vertical side edges that are configured to interconnect with side edges of adjacent partition panel frames to enable installation of the utilities infeed panel between a pair of adjacent panels to form an integral part of the partition wall. The empty panel frame defines first and second opposite side faces, and a vertically-extending central space connected to an opening in the ceiling. A first cover panel is connected to the first side face of the empty panel frame. A second cover panel is removably connected to the second side face, and closes off the central space. The second cover panel permits access to the central space for utilities management upon removal of the second cover panel. The second cover panel defines an outer surface that is substantially co-planar with the side surfaces of adjacent partition panels.

Yet another aspect of the present invention is a floor-to-ceiling utilities infeed panel including an infeed panel frame defining a vertical center plane, and first and second opposite side faces. The infeed panel frame includes a pair of horizontally spaced-apart vertical frame members, and upper and lower horizontal frame members extending between the vertical frame members and interconnecting the same. The horizontal frame members are disposed in an offset position from the center plane towards the first side face to define a central space within the panel that is connected with an opening in the ceiling for vertical routing of utilities. A first cover panel is connected to the first side face of the infeed panel frame. A second cover panel is removably connected to a second side face of the panel frame, and closes off the central space to facilitate installation and removal of utilities within the open space.

Yet another aspect of the present invention is a floor-to-ceiling utilities infeed panel including an infeed panel frame defining first and second opposite faces. Cover panels are removably mounted on the side faces of the infeed panel frame to define a central space within the panel extending vertically to an opening in the ceiling to permit vertical routing of utilities through the central space within the infeed panel and through the ceiling. A termination panel support member is movably mounted to the infeed panel frame, and disposed within the central space. A termination panel is mounted on the support member within the central space, and includes a plurality of data connection ports.

These and other features, advantages and objects of the present invention will be further understood and appreciated by those skilled in the by reference to the following specification, claims and appended drawings.

BRIEF DESCRIPTION OF THE DRAWINGS

FIG. 7 is a view of the infeed panel frame of FIG. 4 showing the panel-to-panel connector bracket;

FIG. 9 is a view of the upper portion of the infeed panel frame of FIG. 3;

FIG. 10 is a cross-sectional view of the infeed panel frame taken along the line X—X; FIG. 4;

FIG. 17 is a top plan view of the extension and utility support member;

FIG. 18 is a side elevational view of the extension and utility support member;

FIG. 19 is a front elevational view of the extension and utility support member;

FIG. 23 is an exploded perspective view showing the installation of the lower cover panels;

FIG. 23.

DETAILED DESCRIPTION OF PREFERRED EMBODIMENT

Figure 1:
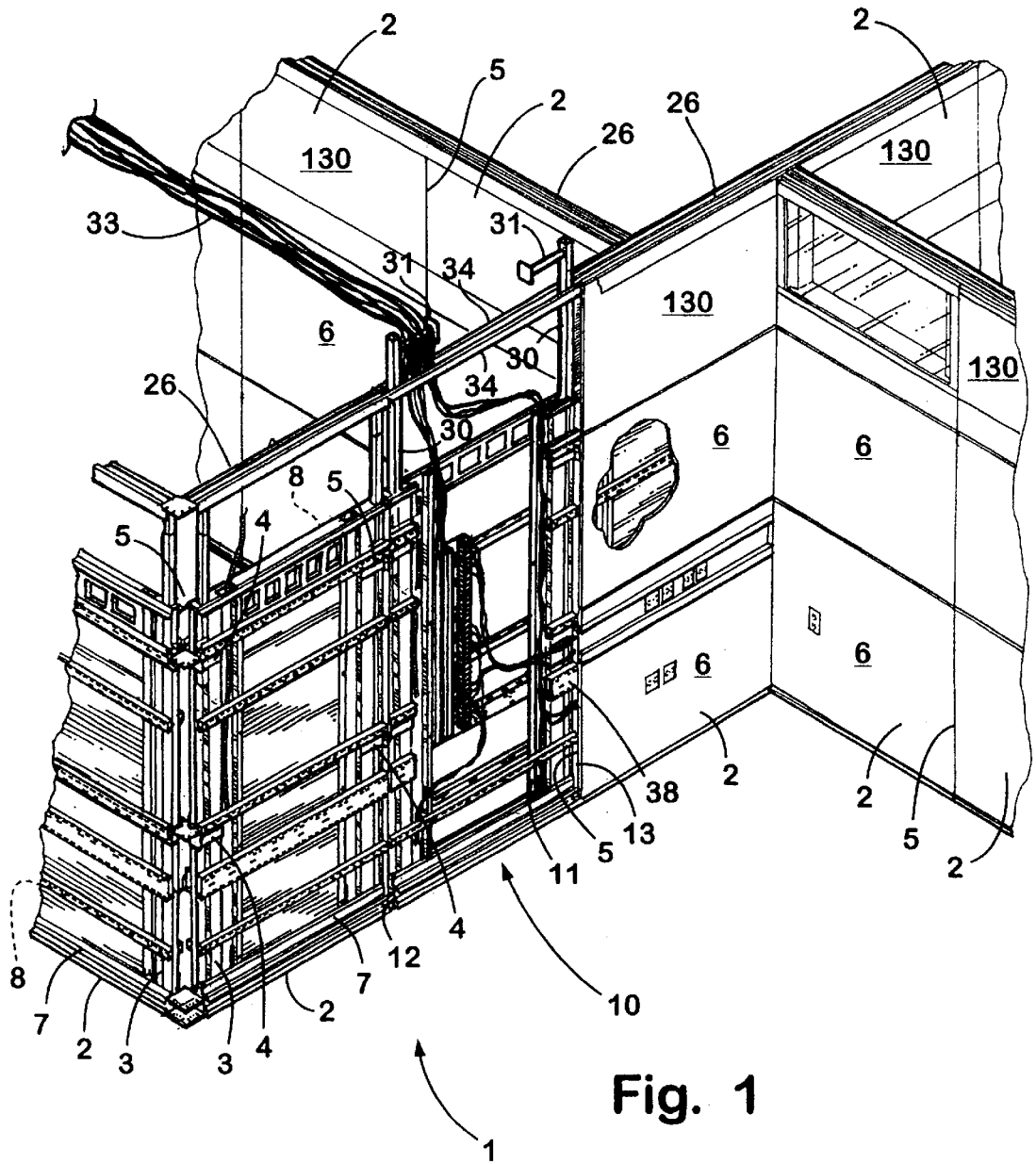
FIG. 1 is a fragmentary, perspective view of a floor-to-ceiling partition wall system embodying the present invention, wherein a portion thereof has been broken away to reveal internal construction.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
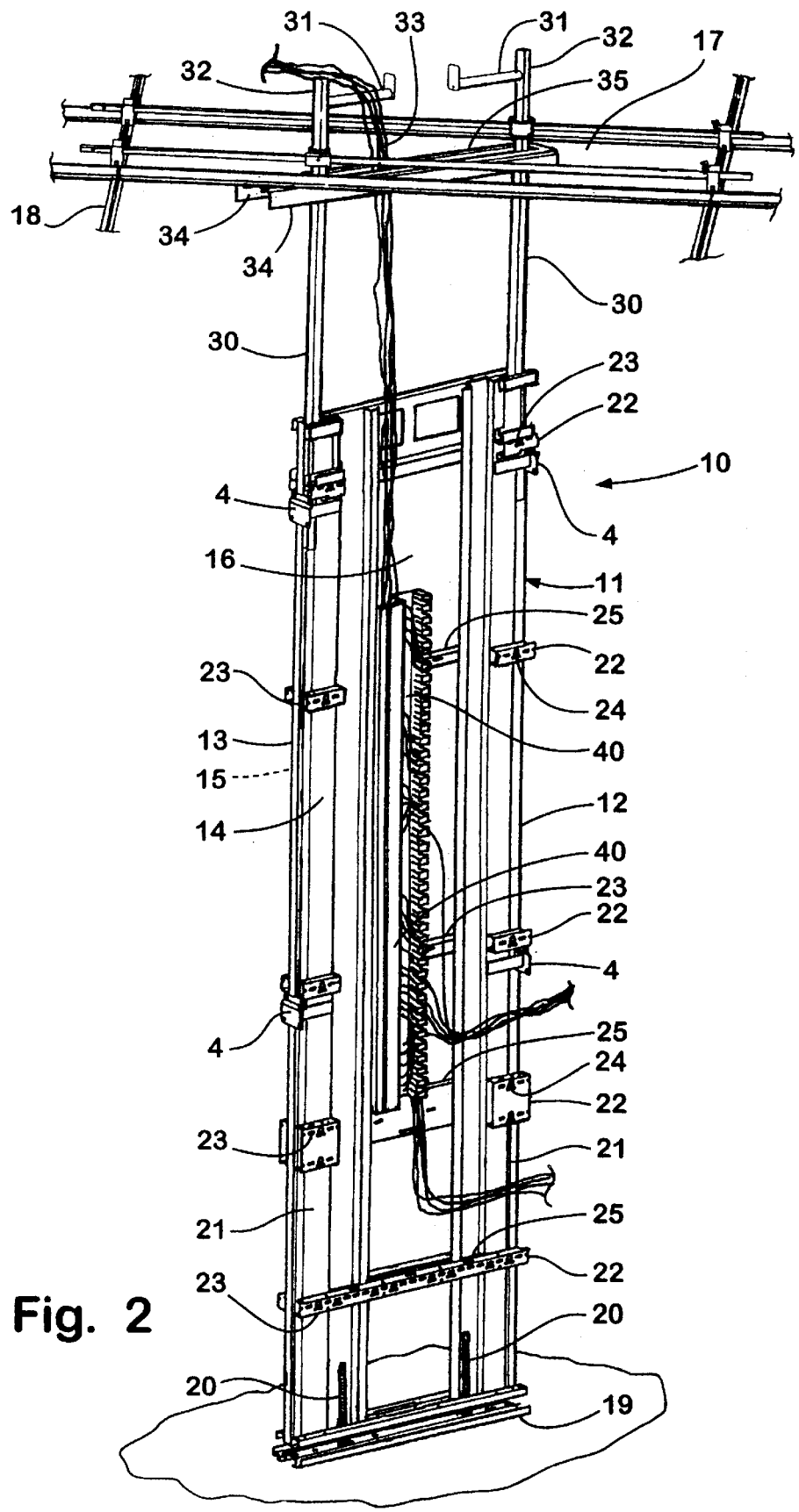
FIG. 2 is a fragmentary, perspective view of the infeed panel frame with extensions connected to the frame and extending through a suspended ceiling.

The reference numeral 1 (FIG. 1) generally designates a partition wall system embodying the present invention, which is particularly designed for use in office spaces, and other similar settings and environments. In the illustrated example, the partition wall system 1 includes a plurality of partition panels 2, each having panel frames 3 interconnected by connectors, such as brackets 4 along opposite side edges 5 of the panel frames 3. The partition panels 2 have cover panels 6 mounted on opposite side faces 7 and 8 of the panel frames 3 to form partition wall 1 having substantially planar side surfaces. The partition wall system 1 includes a utilities infeed panel or chase 10 having an infeed panel frame 11 with opposite vertical side edges 12 and 13 that are interconnected with side edges 5 of adjacent partition panel frames 3 such that the utilities infeed panel 10 forms an integral portion of the partition wall 1. The infeed panel frame 11 defines first and second side faces 14 and 15, and a vertically-extending central space 16 connected to an opening 17 in the ceiling 18 (FIG. 2). A first cover panel 6 is connected to the first side face 14, and a second cover panel 6 is removably connected to the second side face 15, and closes off the central space 16. The second cover panel 6 permits access to the central space 16 for utilities management upon removal of the second cover panel 6. Partition panels 2 are described in detail in the above-referenced U.S. patent application Ser. No. 09/038,371, entitled "WALL PANEL PARTITION SYSTEM", filed Mar. 10, 1998, and hence will not be described in detail herein.

With further reference to FIG. 2, a pair of jack screws 20 adjustably support the infeed panel frame 11 on a floor track 19. Infeed panel frame 11 includes a pair of horizontally spaced-apart vertical frame members 21, and a plurality of horizontal frame members 22. The horizontal frame members 22 include horizontal rows of slots 23 for removably supporting hang-on accessory units, such as worksurfaces and the like at discreet, horizontally spaced-apart locations. As described in more detail below, horizontal frame members 22 also include a plurality of openings 24 that receive clips to removably retain cover panels 6 to the infeed panel frame 11. As also described in more detail below, the upper surfaces of each horizontal frame member 22 include a plurality of openings 25 for support of a lower edge of a cover panel 6.

A pair of tubular extensions 30 are fixed to the infeed panel frame 11, and extend upwardly above a suspended ceiling 18. A utility support member, such as horizontally-extending tube 31, is fixed to the upper portion 32 of each tubular extension 30 at a position above the suspended ceiling 18. Horizontally-extending tube 31 supports utility lines such as power and/or data lines 33 above the suspended ceiling 18 to facilitate routing of the data lines 33. A pair of ceiling trim pieces 34 are connected to the side faces of tubular extensions 30, and are spaced-apart to form an opening 35 that is connected with the opening 17 in the suspended ceiling 18 to permit a large volume of power and/or data lines 33 to pass upwardly through the suspended ceiling 18. Ceiling trim pieces 34 retain the upper edges of the upper cover panels 130, and also provide an appearance that is consistent with the ceiling track 26 of the adjacent partition panels 2. Accordingly, the need for a separate "power pole," or other ceiling infeed arrangement is eliminated.

Figure 3:
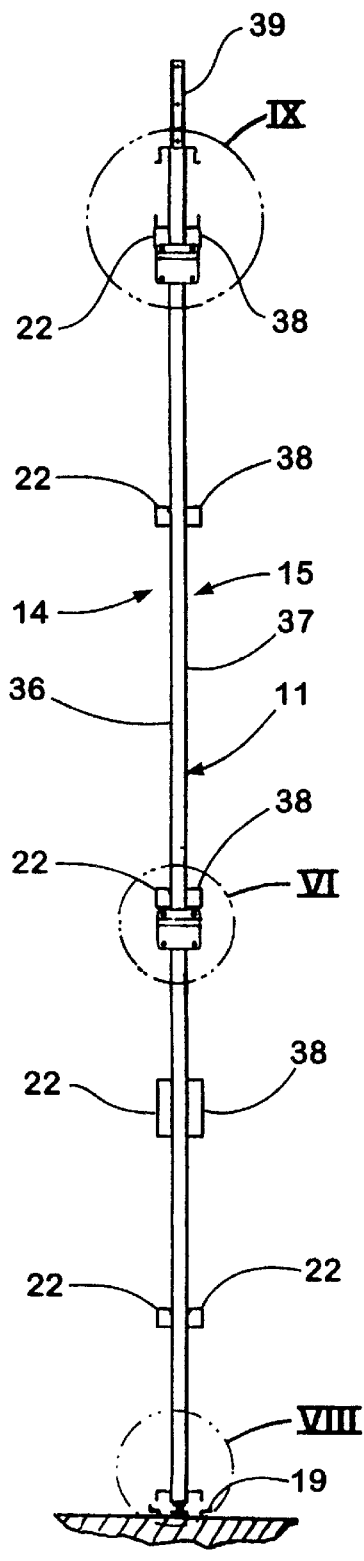
FIG. 3 is a side elevational view of the infeed panel frame.
Figure 4:
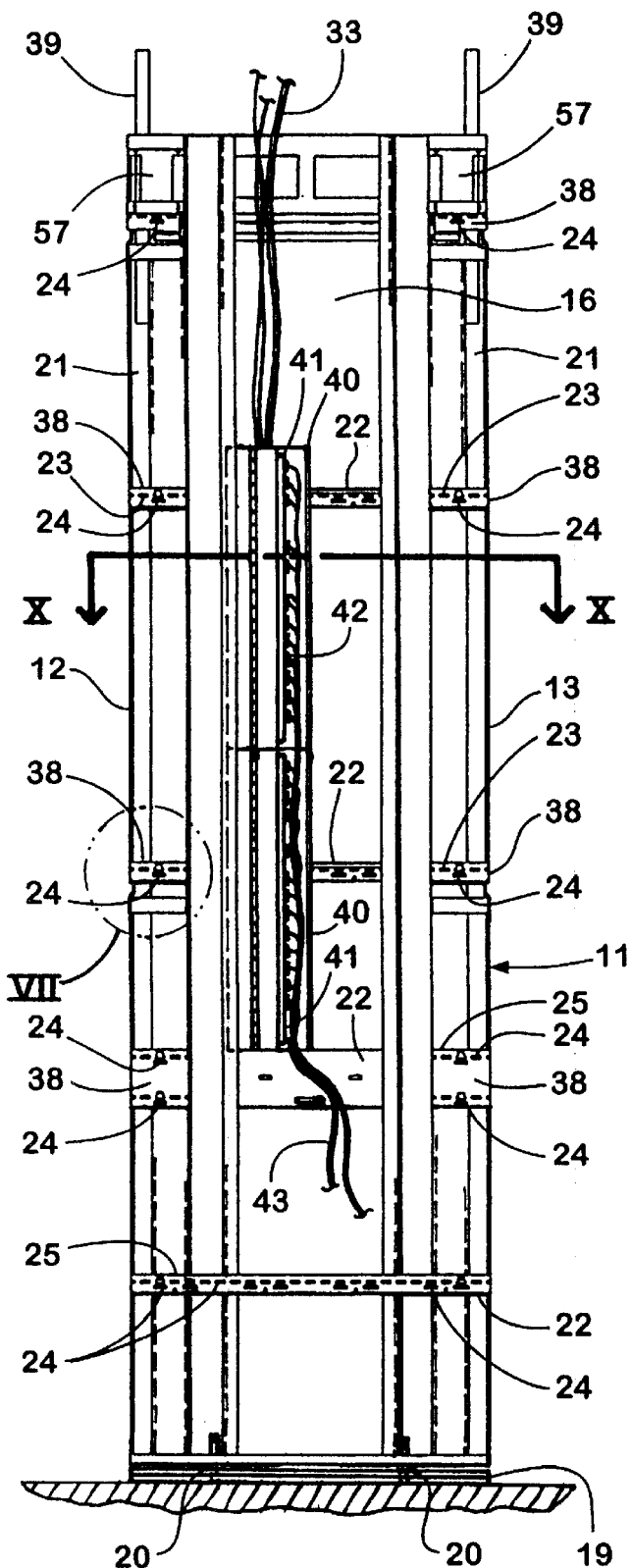
FIG. 4 is a front elevational view of the infeed panel frame.
Figure 5:
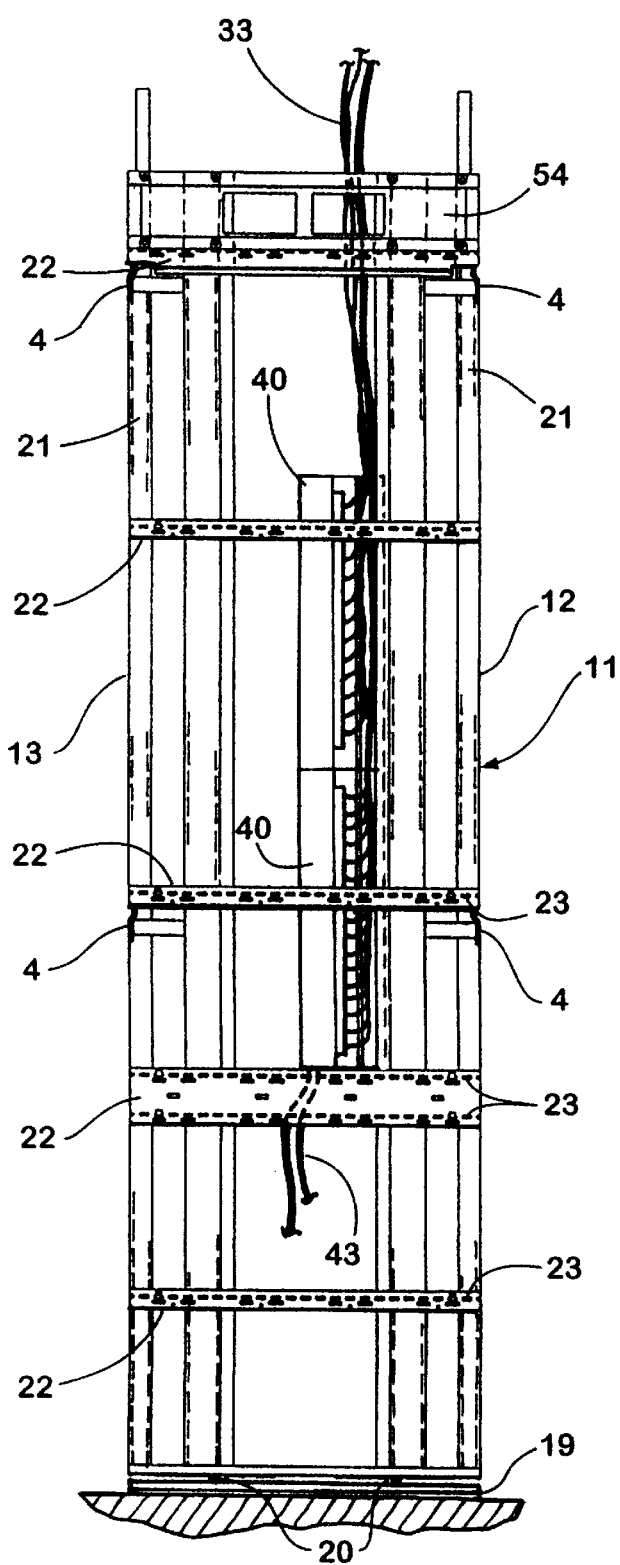
FIG. 5 is a rear elevational view of the infeed panel frame.

With further reference to FIGS. 3–5, vertical frame members 21 define first and second side faces 36 and 37. Horizontal frame members 22 are welded or otherwise secured to the first side faces 36 of vertical frame members 21 such that the horizontal frame members 22 are offset from a center plane of the infeed panel frame 11. A plurality of skin support members 38 are welded or otherwise secured on the second side face 37 of vertical frame members 21. Skin support members 38 have substantially the same cross-sectional shape as horizontal frame members 22, and are located on second side faces 37 of vertical frame members 21 at the same vertical location as horizontal frame members 22. Skin support members 38 include openings 24 and 25 for support of cover panels 6. Skin support members 38 may include horizontal slots 28 for supporting hang-on accessory units if required for a particular application. Cover panel support members 38 are "cut-out" across the center portion of the infeed panel frame 11, defining an open central space 16 that permits lay-in of communications cabling 33 and the like from the side of the infeed panel. Central space 16 has a generally U-shaped cross section defined by the inner faces of horizontal frame members 22, and the inner faces of vertical frame members 21. A first embodiment of infeed panel frame 11 includes a pair of C-shaped stiles 39 that extend upwardly from the infeed panel frame 11 along the opposite side edges 12 and 13, and telescopically receive the tubular extensions 30 to interconnect the infeed panel frame 11 with the suspended ceiling 18. In another preferred embodiment described below, infeed panel frame 11 does not include C-shaped stiles 39, such that extensions 30 are secured directly to vertical frame members 21. As also described in more detail below, a pair of standard nineteen-inch termination or "patch" panels 41 are mounted on a termination panel support member such as doors 40. Termination panels 41 include a plurality of data receptacles 42 that permit data or phone lines 43 to be removably connected to the termination panel 41 within the utilities infeed panel 10. A preferred embodiment utilizes a 24 port patch panel 41. This arrangement permits individual phone lines 43 to be connected or disconnected from a given line within the partition panel system, thereby eliminating rerouting of an individual phone line 43 from a "phone closet." Because the phone closet may be located a substantial distance from a given work area, considerable effort and associated expense can be encountered if a phone line must be rerouted along the entire partition panel section that extends between the phone closet and the individual work space.

Figure 6:
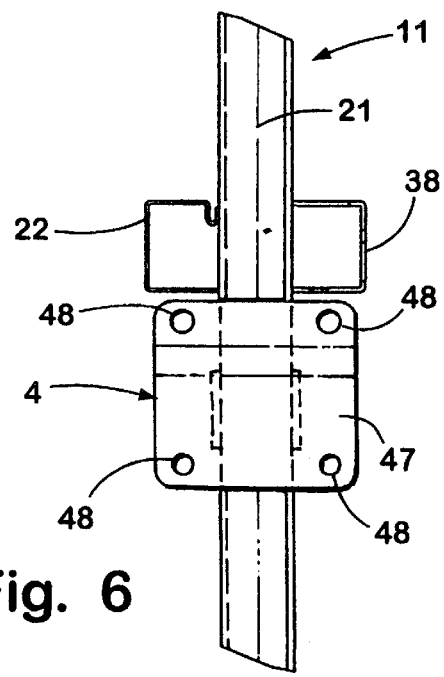
FIG. 6 is a view of the panel-to-panel connector of FIG. 3.

With reference to FIG. 6, each connector bracket 4 includes a plate 47 having a plurality of openings 48 that receive fasteners to rigidly interconnect the opposite side edges 12 and 13 of the infeed panel frame 11 to the adjacent panel frames 3, thereby permitting installation of the utilities infeed panel within the partition wall system 1. The adjacent panels frames 3 also include connector brackets 4 that are substantially the same as that illustrated in FIG. 6, such that the openings 48 in connector brackets 4 of adjacent panel frames can be aligned to receive screws or other fasteners. With further reference to FIG. 7, plate 47 is welded to a pair of straps 49 that are spot welded to the vertical frame member 21 at 50. Opposite side edges 12 and 13 of infeed panel frame 11 may also be interconnected to partial height panels to provide utilities infeed from the ceiling 18. As described in more detail in the above-referenced co-pending U.S. patent application Ser. No. 09/038,371, entitled "WALL PANEL PARTITION SYSTEM", filed Mar. 10, 1998, plate 47 includes an offset portion 51 to provide clearance for fasteners when utilities infeed panel 10 or a standard partition panel 2 are interconnected to another partition panel 2 in an off-module configuration.

Figure 8:
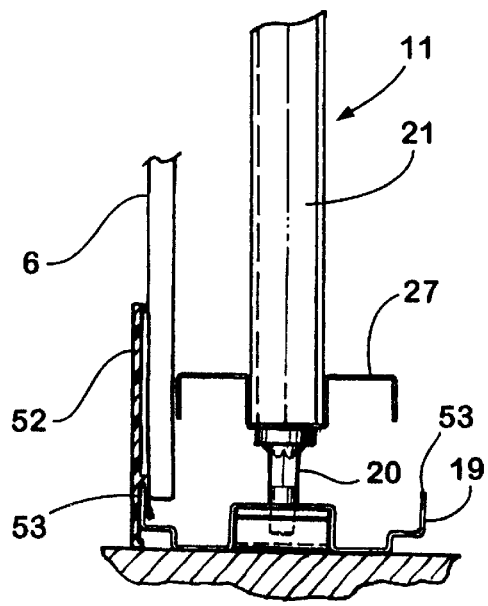
FIG. 8 is a view of the lower portion of the infeed panel frame of FIG. 3.

With reference to FIG. 8, jack screws 20 are threadably mounted to the infeed panel frame 11, and pass through a lower horizontal frame member 27 to adjustably support the infeed panel frame 11 on the floor track 19. Base trim 52 clips onto the upwardly-extending flange 53 of floor track 19 to cover the lower edge of a cover panel 6.

With reference to FIG. 9, a C-channel 54 is secured to the first side face 36 of the vertical frame members 21, and extends horizontally between the first and second side edges 13 of the infeed panel frame 11. C-channel 54 forms a horizontal raceway or "expressway" 55 for lay-in of utility lines such as data lines 33 and/or power lines 29. Adjacent panels 2 also have C-channels 54, thereby permitting horizontal routing of utility lines throughout partition wall system 1. A pair of short C-channels 57 are mounted on the second side face 37 of vertical frame members 21. With further reference to FIG. 4, the short C-channels 57 provide an open central space, such that power and/or data lines 33 can be laid-in from the side of the partition panel, and routed upwardly through the ceiling. A polymer raceway cover 56 (FIG. 9) may be removably connected to the C-channel 54, and/or the short C-channels 57. Furthermore, as described below, the upper cover panel may extend downwardly over the C-channels 54 and 57, with the lower edge of the cover panel being supported by the upwardly-extending flange 58 such that a raceway cover 56 is not utilized.

Figure 11:
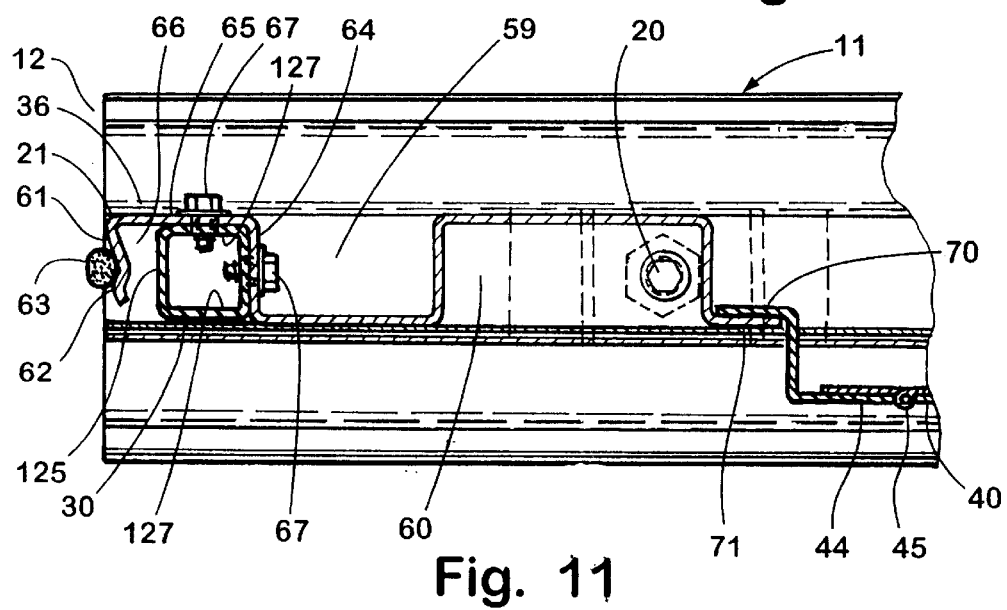
FIG. 11 is a cross-sectional view of the infeed panel frame of FIG. 10.

With reference to FIGS. 10 and 11, vertical frame members 21 include first and second channels 59 and 60 with outwardly opening sides that are juxtaposed in opposite directions to facilitate vertical routing of utilities therein along the opposite side faces 14, 15 of the infeed panel frame 11. End flanges 61 of vertical frame members 21 extend vertically along the side edges 12 and 13 of the infeed panel frame 11, and include an indented center 62 that forms a pocket that may receive a resilient, cylindrical seal 63. The resilient seal 63 is compressed between the end flanges 61 of adjacent panel frames to provide a light barrier between adjacent panels. As described in more detail below, a pair of doors 40 each support a termination or patch panel 41 to provide for plug-in of individual phone lines 43 within the partition panel system. Doors 40 are pivotally mounted to door bases 44 by piano hinges 45. Horizontal frame members 22 extend along the first side face 14 of the infeed panel frame 11 such that hang-on accessory units can be mounted to the first side face 14. Accordingly, door 40 pivots outwardly to provide access to the data lines 33 within the door 40 if access is blocked to the first side 14 due to the presence of hang-on partition units and the like that are secured to slots 23. Transverse wall 64 (FIG. 11), end wall 65, and end flange 61 of vertical frame members 21 form outer channels 66 that extend vertically adjacent the vertical side edges 12 and 13 of infeed panel frame 11. In a preferred embodiment, tubular extensions 30 are telescopically received within the outer channel 66, and are secured to the transverse walls 64 of vertical frame members 21 by a plurality of self-tapping screws or fasteners 67. As described in more detail below, each tubular extension 30 includes a plurality of clearance holes spaced at six-inch intervals that receive fasteners 67, such that the tubular extensions 30 can be extended upwardly or downwardly as required to account for variations in the floor-to-ceiling spacing.

Figures 12, 13:
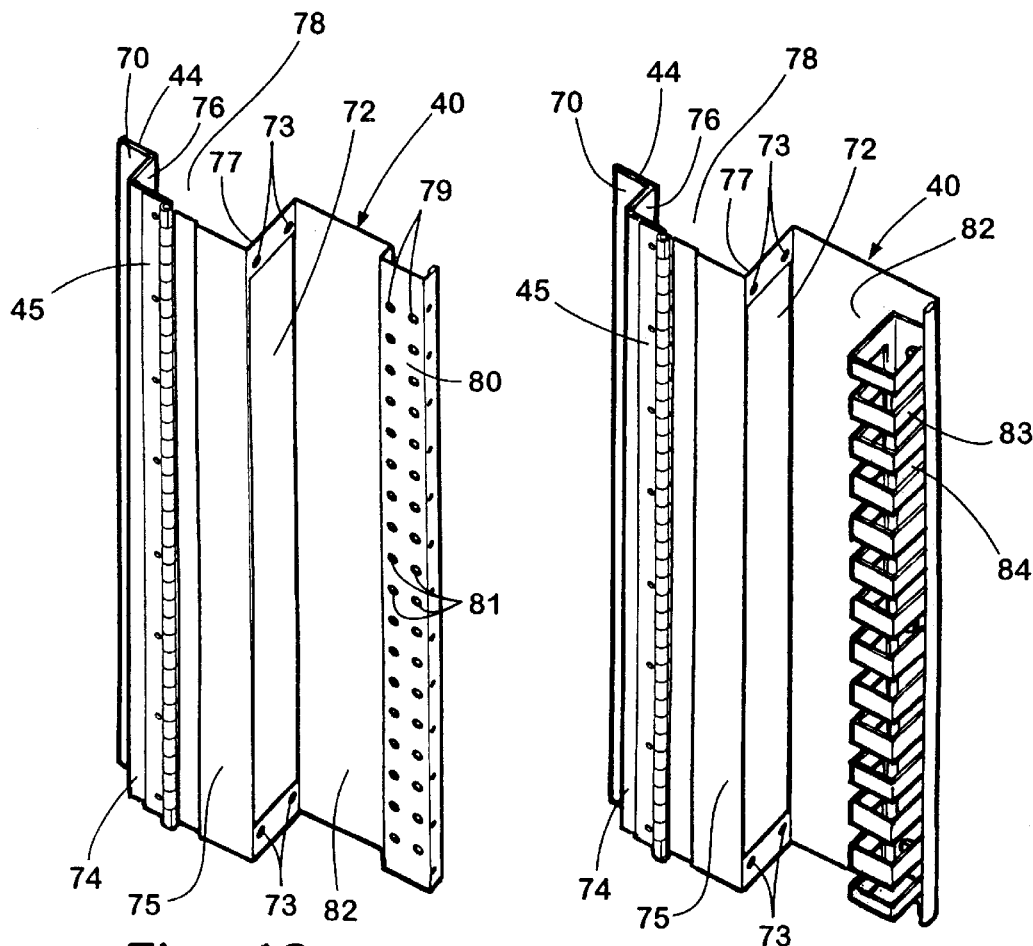
FIG. 12 is a perspective view of a first embodiment of the door used to support the termination panel.
FIG. 13 is a perspective view of a second embodiment of the door used to support the termination panel.

With reference to FIG. 12, a first embodiment of the door 40 includes a door base 44 with a flange 70 that is spot-welded or otherwise secured to the inner flange 71 (FIG. 11) of the vertical frame member 21. A piano hinge 45 pivotally interconnects the door base 44 and the door 40. Door 40 includes an elongated opening 72, and upper and lower pairs of openings 73 that receive fasteners for mounting a data termination or patch panel 41. The data termination panel 41 fits over the opening 72, and includes a plurality of data receptacles 42 that facilitate reconfiguration of data lines such as phone lines and the like in a work space. The upper openings 73 are spaced-apart from the lower openings 73 at a nineteen-inch distance, such that a standard nineteen-inch termination panel 41 may be secured to the door 40. A preferred patch panel 41 is a nineteen-inch, 24 port model manufactured by Lucent Technologies, Inc., 600 Mountain Avenue, Murray Hill, N.J., part No. 1100CAT5PS-24B. If required, patch panel 41 may be mounted using an industry standard rack unit or bracket, such as part No. 1100C1-35-19, also manufactured by above-identified Lucent Technologies, Inc. Numerous other patch panel arrangements are also suitable for the present infeed panel. Furthermore, although a pivotally mounted door arrangement facilitates access to both sides of patch panel 41, a stationary bracket could be utilized to mount patch panel 41 to horizontal frame members 22, or to vertical frame members 21. Offset flanges 74 and 75 of door base 44 and door 40, along with offset flanges 74 and 75, define a passage 78 within the door 40 for vertical routing of the data lines 33 upwardly through the ceiling 18. A plurality of tie straps 81 may be received in the openings 79 in outer flange 80 of door 40 to secure the individual data lines 43. With reference to FIG. 13, a second embodiment of the door 40 is substantially similar to the embodiment illustrated in FIG. 12, except that side flange 82 extends outwardly, and a commercially available wire retainer 83 is mounted thereto. Wire retainer 83 is polymer, with a generally rectangular cross-sectional shape, and has a plurality of slots 84 that receive and retain the individual phone lines 43. Door 40 may include a latch (not shown) to retain the door in the closed position.

Figure 14:
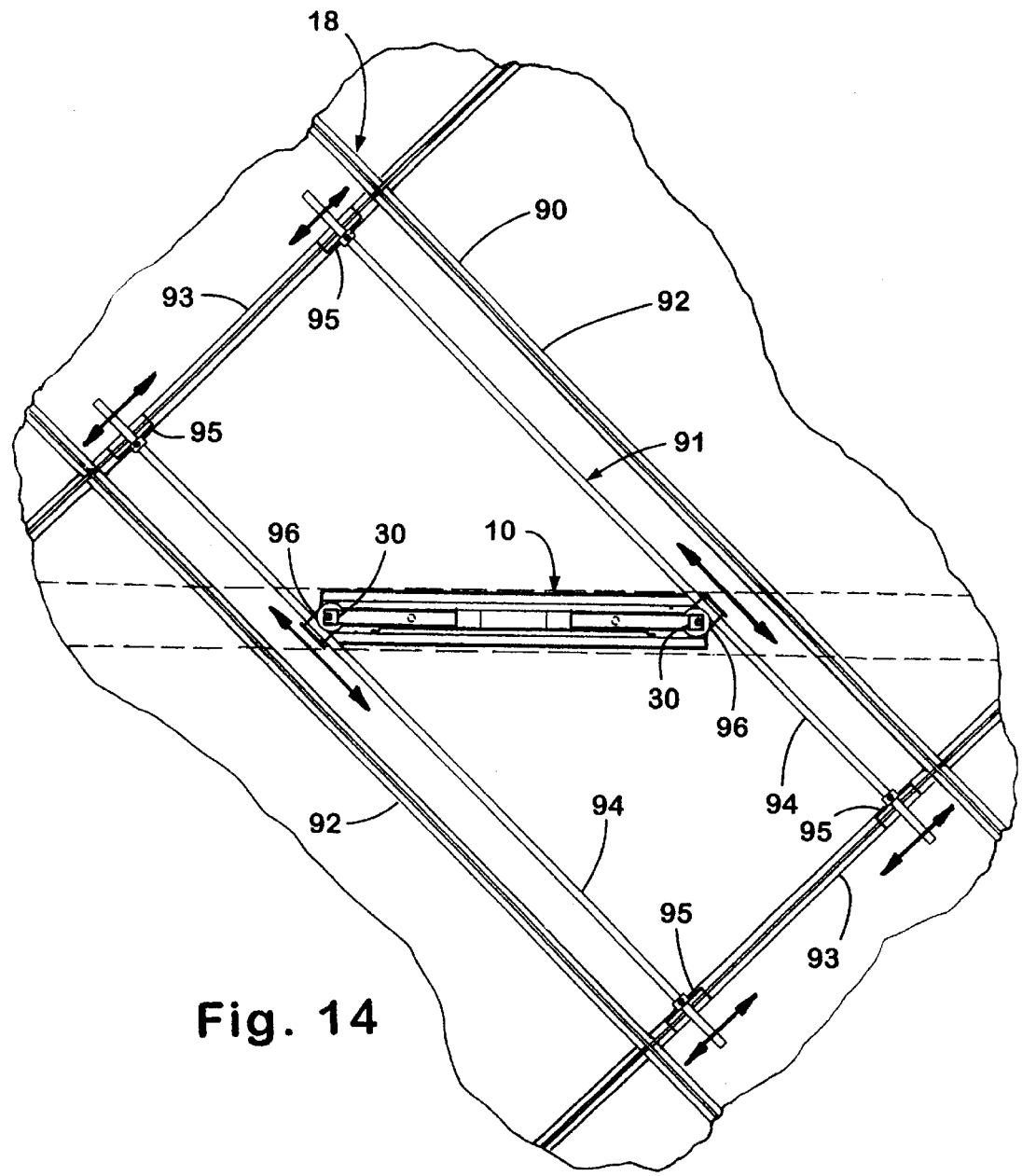
FIG. 14 is a top plane view of the utilities infeed panel showing the connection of the infeed panel frame extensions to a ceiling grid at an angle.
Figures 15, 16:
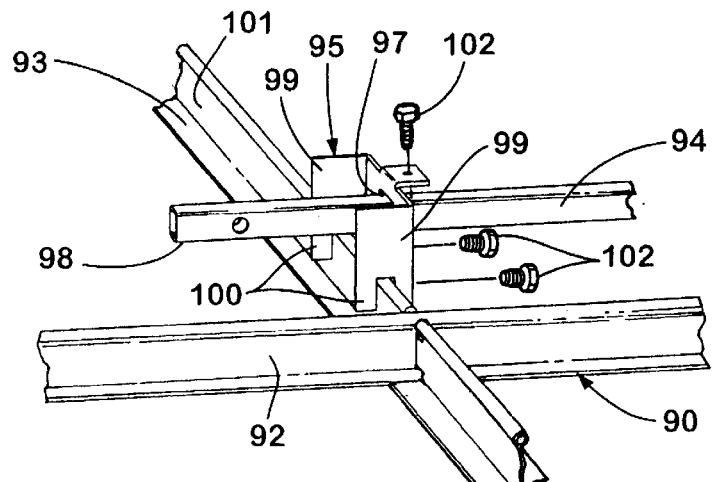
FIG. 15 is a fragmentary, perspective view showing a bracket connected to a ceiling grid member.
FIG. 16 is a fragmentary, perspective view showing a utility support member and an extension extending between the ceiling trim pieces.

With reference to FIG. 14, an adjustable assembly 91 interconnects the tubular extensions 30 with the standard ceiling grid 90 of a conventional suspended ceiling 18. Ceiling grid 90 includes a plurality of grid members 92, as well as a plurality of cross members 93, each of which has an inverted "T" cross-sectional shape. Horizontal support tubes 94 are connected to cross members 93 by brackets 95 adjacent each end of the support tubes 94. Straps 96 interconnect tubular extensions 30 to the horizontal support tubes 94. Brackets 95 can be mounted at various locations along the cross member 93, and straps 96 can also be secured to the horizontal support tubes 94 at various locations, thereby permitting utilities infeed panel 10 to be mounted at an angle to the ceiling grid as illustrated in FIG. 14. Accordingly, utilities infeed panel 10 can be interconnected to the ceiling grid 90 at numerous locations and orientations, as required for a given application. With further reference to FIG. 15, each end portion 98 of each support tube 94 is slidably received within an opening 97 in a bracket 95. Sidewalls 99 of bracket 95 include cut-out portions 100 that receive the upper leg 101 of a cross member 93 of the ceiling grid 90. After the bracket 95 is positioned in the desired location on cross member 93, and support tube 94 is positioned in the desired position within brackets 95, fasteners 102 are installed to secure bracket 95 and support tube 94 in the desired location.

With reference to FIG. 16, strap 96 receives a nylon bushing 103 having a rectangular opening 104 therethrough that receives tubular extension 30. A plate 105 of strap 96 has a threaded opening 106 that receives a fastener 107 that abuts the sidewall 108 of support tube 94 to secure the strap 96 and tubular extension 30 in a desired position. Support tube 94 passes through a pair of square openings 109 in strap 96 to slidably support strap 96.

With reference to FIGS. 17–19, horizontal tube 31 is welded to tubular extension 30, and extends horizontally therefrom. Plate 110 is welded to the end of horizontal tube 31, and includes an upwardly-extending portion 111 forming a utilities retaining member. Horizontal tube 31 is circular in cross section, and provides support for routing data lines 33 above ceiling 18. A plurality of holes 112 are provided in at least two of the side faces of the tubular extensions 30. Holes 112 receive fasteners 67 to retain extension 30 within outer channel 66 of vertical frame members 21 (see also FIG. 11) at a selected height. In a preferred embodiment, a plurality of openings are also provided in transverse walls 64 and 65 of vertical frame member 21, such that tubular extension 30 can be moved upwardly or downwardly as required at six-inch increments to adjust the vertical location of the horizontal tube 31 at the required distance above the ceiling 18.

Figure 20:
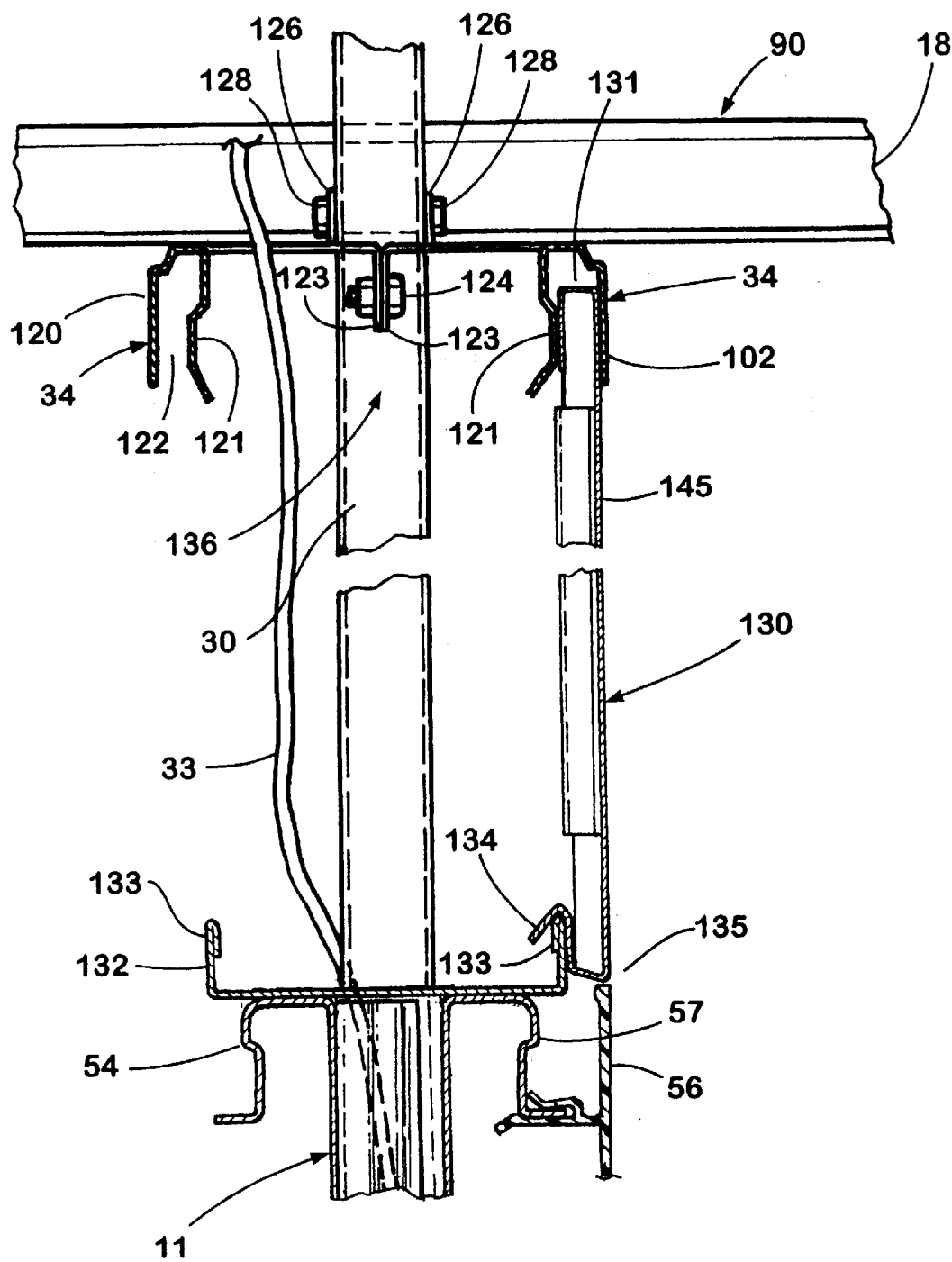
FIG. 20 is a cross-sectional view taken along the line XX—XX.
Figure 21:
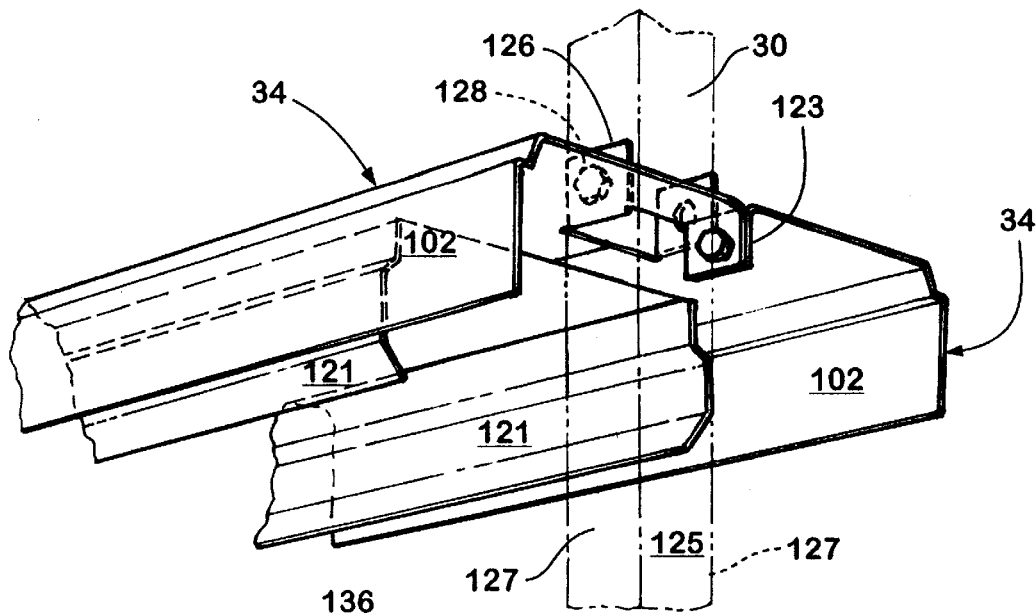
FIG. 21 is a fragmentary, perspective view showing the ceiling trim pieces connected to an extension.

With reference to FIGS. 20 and 21, ceiling trim pieces 34 include downwardly-extending outer sidewalls 120, and downwardly-extending inner flanges 121 that form a cover panel retaining channel 122. Each ceiling trim piece 34 includes a tab 123 that extends along the outer sidewall 125 (see also FIG. 11) of extension 30, with a clearance hole therein that receives fastener 124 to interconnect a pair of ceiling trim pieces 34. Upwardly-extending tabs 126 receive fasteners 128 to secure the ceiling trim pieces 34 to the opposite sidewalls 127 of tubular extension 30. Infeed panel frame 11 may include a U-shaped horizontal member 132 that is secured to the top of C-channel 54 and short C-channels 57. Upper cover panel 130 includes a downwardly-opening hook or flange 134 extending along the lower edge 135 that fits over the upwardly-extending flange 133 of U-shaped member 132 to support the lower edge 135 of upper cover panel 130. The upper edge 131 of upper cover panel 130 is received within channel 122 of ceiling trim piece 34. Due to variations in the floor-to-ceiling spacing, the upper portion of upper cover panel 130 may be cut off to reduce the overall height of upper cover panel 130. Cutting off the upper end of cover panel 130 produces an upper end 131 of upper cover panel 130 that may be irregular and/or unsightly. Outer sidewall 120 and inner flange 121 of ceiling trim pieces 34 retain and receive the upper portion 131 of cover panel 130 to provide a finished appearance. Inner flanges 121 define an opening 136 therebetween that permits routing of data lines 33 upwardly through the ceiling 18 (see also FIG. 16). Opening 136 extends between extensions 30, and provides a relatively large opening, such that large numbers of data and/or power lines can be routed through the ceiling 18.

Figure 22:
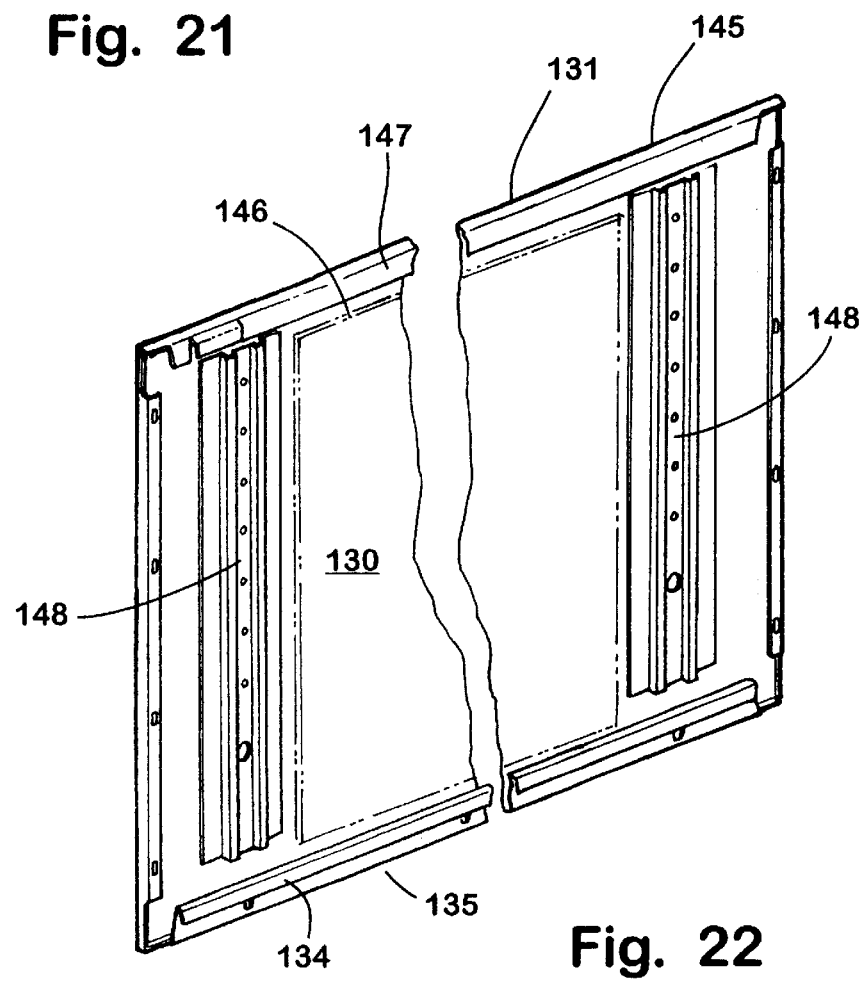
FIG. 22 is a fragmentary, perspective view of an upper cover panel.

With reference to FIG. 22, an upper cover panel 130 may comprise a sheet metal skin 145 that is folded over along the top edge 131 to form downwardly-extending flange 147. A downwardly-opening hook or flange 134 extends along the lower edge 135 of upper cover panel 130. Cover panel 130 may include a sound-insulating mat or other material 146, and vertical braces 148 may also be provided.

Figure 23:
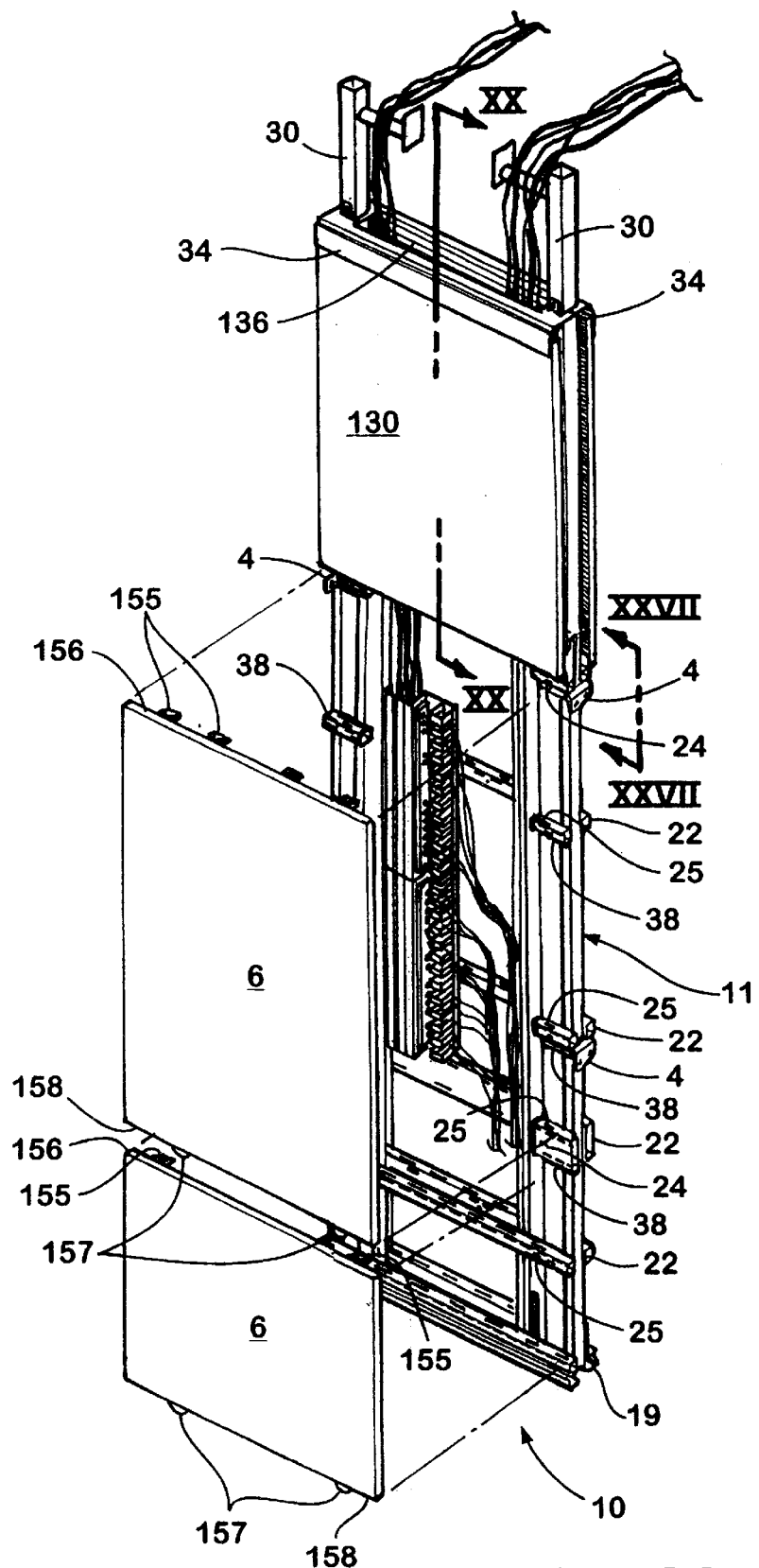
FIG. 23.

With reference to FIG. 23, lower cover panels 6 may be secured to skin support members 38 on the open side face 15 of infeed panel frame 11, as well as to the horizontal frame members 22 on the closed, or first side face 14 of infeed panel frame 11. Lower cover panels 6 include a plurality of clips 155 along upper edge 156 that are received within openings 24 (see also FIG. 7) of skin support members 38 or horizontal frame members 22. As discussed above, skins support members 38 and horizontal frame members 22 include openings or slots 25 in the upper, horizontal surface. Openings 25 receive fingers or tabs 157 located along the lower edge 158 of a lower cover panel 6. Lower cover panels 6 are installed by inserting fingers 157 in openings 25, and upper edge 156 is then rotated inwardly until the clips 155 engage openings 24 in a horizontal frame member 22 or a skin support member 38.

Figure 24:
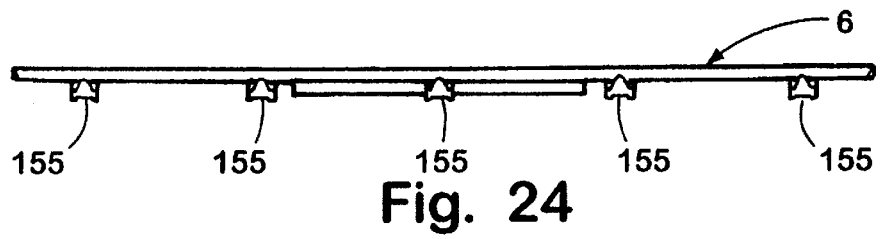
FIG. 24 is a top plan view of a lower cover panel.
Figures 25, 26:
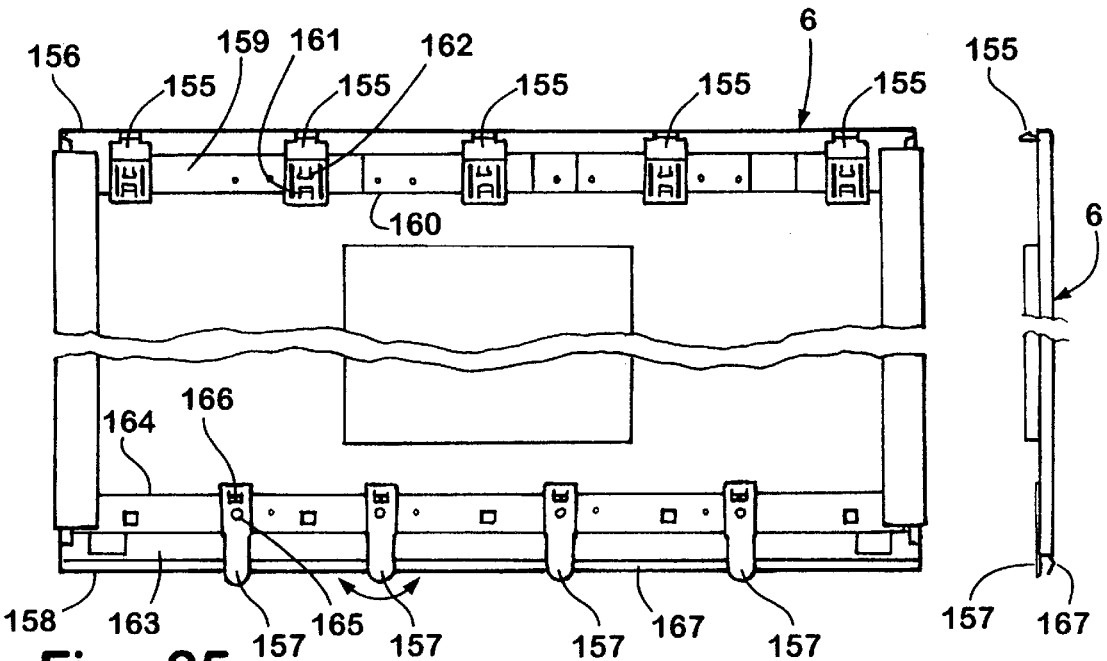
FIG. 25 is a front elevational view of the lower cover panel.
FIG. 26 is a side elevational view of the lower cover panel.

With further reference to FIGS. 24–26, cover panels 6 include a downwardly-extending flange 159 having a lower edge 160. Clips 155 include a first tab 161 that fits over the lower edge 160 of flange 159, and a second tab 162 is received within an opening (not shown) in flange 159 to retain clip 155. An upwardly-extending flange 163 extends along the lower edge 158 of cover panel 6 and terminates at an upper edge 164. Each finger 157 is pivotally mounted to the flange 163 at 165 to permit rotation of finger 157 to provide clearance such that hang-on accessory units can be mounted on slots 123 if required. A flexible offset tab 166 contacts the flange 163 to provide a frictional engagement to retain fingers 157 at a selected angular orientation. A flexible light seal 167 extends along the lower edge 158 of cover panel 6 to prevent light transmission between the edges of adjacent cover panels 6.

Figure 27:
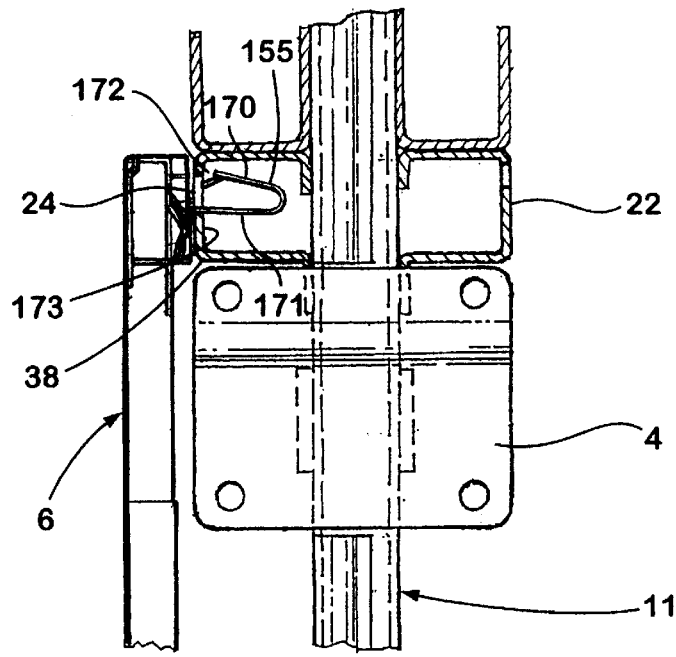
FIG. 27 is a view of the cover panel in an installed position taken along the line XXVII—XXVII.

With reference to FIG. 27, each clip 155 has a generally V-shape with an upper leg 170, and a lower leg 171. Upper and lower legs 170 and 171 flex towards one another during insertion of clip 155 in slot 24. When in the installed position illustrated in FIG. 27, upper leg 170 flexes upwardly, and the end or edge 172 of upper leg 170 abuts the inner surface 173 of skin support member 38 or horizontal frame member 22 thereby retaining cover panel 6 to infeed panel frame 11.

The utilities infeed panel 10 of the present invention forms an integral part of a partition wall system 1, thereby providing a uniform appearance. The opening 136 along the top edge of the utilities infeed panel connects to an opening in the ceiling, thereby permitting a large number of utilities, such as data and/or power lines 33 to be routed into the utilities infeed panel 10 from above the suspended ceiling 18. Furthermore, the tubular extensions 30 and horizontal extension tubes 31 can be easily adjusted to accommodate various floor-to-ceiling dimensions, and the jack screws and floor track 19 permit leveling and integration of the utilities infeed panel within the partition wall system 1. The connector brackets 4 located on the opposite vertical side edges 12 and 13 of the utilities infeed panel 10 permit a rigid interconnection to the side edges of the adjacent partition panels 2. The termination or patch panel 41 is mounted on a door 40 that is pivotally mounted to the infeed panel frame 11 to provide a connection point for individual phone lines 43 adjacent the individual work spaces. Horizontal frame members 22 are offset, providing a vertically-extending central space 16 to permit lay-in of vertical utility lines within the utilities infeed panel 10. Skin support members 38 provide openings for mounting of cover panels in the same manner as the cover panels utilized on the adjacent partition panels 2, thereby eliminating the need for a special cover panel arrangement for the utilities infeed panel 10.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A floor-to-ceiling partition wall system, comprising:

a plurality of partition panels having sufficient height to extend between a floor and a ceiling, and including panel frames interconnected along opposite side edges thereof and defining opposite side faces, and having cover panels mounted on said opposite side faces of the panel frames to form a partition wall having substantially planar side surfaces and an interior space extending between adjacent partition panels to permit horizontal routing of utility lines between said adjacent partition panels;

a utilities infeed panel including:

an infeed panel frame extending from adjacent a floor height to a ceiling height and having opposite side edges interconnected with side edges of adjacent partition panel frames and forming an integral portion of the partition wall, said infeed panel frame defining first and second opposite side faces and a central space adapted to be connected to an opening in the ceiling and connected with said interior space and having a U-shape in plan view that extends uninterrupted from adjacent said floor height to said ceiling height to form an enlarged vertical channel that is open to said second side face to permit vertical lay-in of utility lines from a ceiling height to a height equal to said interior space, such that utility lines can be routed horizontally across said side edges of said infeed panel into said interior spaces of said adjacent panel frames;

a first cover panel connected to said first side face; and a second cover panel removably connected to said second side face and closing off said central space, said second cover panel permitting access to said central space for utilities management upon removal of said second cover panel.

2. The partition wall system set forth in claim 1, wherein:

said infeed panel frame defines a vertical center plane and includes a pair of horizontally spaced-apart vertical frame members defining first and second opposite side faces, and upper and lower horizontal frame members extending between said vertical frame members and interconnecting the same, said horizontal frame members being disposed in an offset position from said center plane to define said vertically extending central space.

3. The partition wall system set forth in claim 2, wherein:

said vertical frame members each define first and second opposite side faces; and said horizontal frame members are fixed to said first opposite side faces of said vertical frame members.

4. The partition wall system set forth in claim 1, including:

at least one extension connected to said infeed panel frame and having an upper portion adapted to extend above the ceiling, said extension including a utility support member configured to support utility lines above the ceiling.

5. The partition wall system set forth in claim 4, including:

a floor track shaped to support said infeed panel on a floor; and a vertically adjustable support interconnecting said infeed panel with said floor track.

6. The partition wall system set forth in claim 5, wherein:

said utility support member comprises an elongated horizontal member having one end fixed to said extension, with an upwardly-extending utilities-retaining member at an opposite, free end.

7. The partition wall system set forth in claim 6, including:

a pair of connector brackets on each opposite side edge of said infeed panel frame, said brackets including a plate with at least one opening therethrough; and fasteners extending through said openings and rigidly interconnecting said infeed panel frame to said adjacent panel frames.

8. The partition wall system set forth in claim 7, wherein:

said extensions are telescopically mounted to said vertical frame members to selectively position said utility support members to account for variations in the floor-to-ceiling spacing.

9. The partition wall system set forth in claim 8, wherein:

said extensions define opposite side faces, and including:

a pair of ceiling trim members disposed adjacent said opposite side faces of said extensions and defining a passageway therebetween adapted to be connected with an opening in the ceiling, each ceiling trim member having a downwardly-extending flange disposed over and retaining an upper edge of said cover panels.

10. In a floor-to-ceiling partition wall of the type having a plurality of partition panels having panel frames interconnected along opposite side edges thereof and cover panels mounted on opposite side faces of the panel frames to form a partition wall having substantially planar side surfaces and horizontally-extending interior spaces with utility lines disposed therein and extending between adjacent partition panels, the improvement comprising:

a utilities infeed panel including:
an infeed panel frame having opposite vertical side edges interconnected with side edges of adjacent partition panel frames enabling installation of said utilities infeed panel between a pair of adjacent panels to form an integral part of a partition wall, said infeed panel frame defining first and second opposite side faces and a vertically-extending central space having a U-shape in plan view that is open along a first side of said infeed panel frame and adapted to connect to an opening in the ceiling, and extending downwardly to the height of said interior spaces and interconnecting therewith, with at least one utility line running downwardly from the ceiling through said central space of said infeed panel and horizontally across said side edge of said infeed panel frame and into said interior space of a selected one of said adjacent partition panels;
a first cover panel connected to said first side face; and
a second cover panel removably connected to said second side face and closing off said central space, said second cover panel permitting access to said central space for utilities management upon removal of said second cover panel; said second cover panel defining an outer surface that is substantially co-planar with the side surfaces of adjacent partition panels.

11. A utilities infeed panel as set forth in claim 10, wherein:
said infeed panel frame defines a vertical center plane and includes a pair of horizontally spaced-apart vertical frame members defining first and second opposite side faces, and upper and lower horizontal fame members extending between said vertical frame members and interconnecting the same, said horizontal frame members being disposed in an offset position from said center plane to define said vertically extending central space.

12. A utilities infeed panel as set forth in claim 11, wherein:
said vertical frame members each define first and second opposite side faces; and
said horizontal frame members are fixed to said first opposite side faces of said vertical frame members.

13. A utilities infeed panel as set forth in claim 10, including:
at least one extension connected to said infeed panel frame and having an upper portion adapted to extend above the ceiling, said extension including a utility support member configured to support utility lines above the ceiling.

14. A utilities infeed panel as set forth in claim 13, including:
a floor track shaped to support said infeed panel on a floor; and
a support adjustably supporting said infeed panel above said floor track.

15. A utilities infeed panel as set forth in claim 14, wherein:
said utility support member comprises an elongated horizontal member having one end fixed to said extension, with an upwardly-extending utilities-retaining member at an opposite end.

16. A utilities infeed panel as set forth in claim 15, including:
a pair of connector brackets on each opposite vertical side edge of said infeed panel frame, said brackets including a plate with at least one opening therethrough; and fasteners extending through said openings and rigidly interconnecting said infeed panel frame to said adjacent panel frames.

17. A utilities infeed panel as set forth in claim 16, wherein:
said extensions are telescopically mounted to said vertical frame members to selectively position said utility support members to account for variations in the floor-to-ceiling spacing.

18. A utilities infeed panel as set forth in claim 17, wherein:
said extensions define opposite side faces, and including:
a pair of ceiling trim members disposed adjacent said opposite side faces of said extensions and defining a passageway adapted to be connected with an opening in the ceiling, each ceiling trim member retaining an upper edge of said cover panels.

19. A utilities infeed panel as set forth in claim 18, including:
an adjustable support interconnecting said extensions to a suspended ceiling.

20. A floor-to-ceiling utilities infeed panel comprising:
an infeed panel frame defining a vertical center plane, vertically extending side edges, and first and second opposite side faces, and including:
a pair of horizontally spaced-apart vertical frame members;
upper and lower horizontal frame members extending between said vertical frame members and interconnecting the same;
said horizontal frame members being disposed in an offset position from said center plane towards said first side face to define a central space within said panel that is adapted to be connected with an opening in the ceiling for vertical routing of utilities, said central space open towards said second side face to permit vertical lay-in of utility lines, said central space further including a horizontally open portion;
a first cover panel connected to said first side face of said infeed panel frame;
a second cover panel removably connected to a second side face of said panel frame and closing off said central space to facilitate installation and removal of utilities within said open central space; and
at least one utility line extending vertically through said central space, and horizontally across a selected one of said side edges through said horizontally open portion.

21. A utilities infeed panel as set forth in claim 20, wherein:
said vertical frame members each define first and second opposite side faces; and
said horizontal frame members are fixed to said first opposite side faces of said vertical frame members.

22. A utilities infeed panel as set forth in claim 20, including:
at least one extension connected to said infeed panel frame and having an upper portion extending above the ceiling, said extension including a utility support member configured to support utility lines above the ceiling.

23. A utilities infeed panel as set forth in claim 22, wherein:
said infeed panel frame defines opposite side edges, each side edge including connectors adapted to interconnect said infeed panel with adjacent panel frames.

24. A utilities infeed panel as set forth in claim 23, including:

a floor track shaped to support said infeed panel on a floor; and a support adjustably supporting said infeed panel on said floor track.

25. A utilities infeed panel as set forth in claim 24, wherein:

said utility support member comprises an elongated horizontal member having one end fixed to said extension, with an upwardly-extending utilities-retaining member at an opposite end.

26. A utilities infeed panel as set forth in claim 25, including:

a pair of connector brackets on each opposite side edge of said infeed panel frame, said connector brackets including a plate having at least one opening therethrough for reception of a fastener to interconnect said infeed panel to an adjacent partition panel.

27. A utilities infeed panel as set forth in claim 26, wherein:

said extensions are telescopically mounted to said vertical frame members to selectively position said utility support members to account for variations in the floor-to-ceiling spacing.

28. A utilities infeed panel as set forth in claim 27, wherein:

said extensions define opposite side faces, and including:
a pair of ceiling trim members secured to said opposite side faces of said extensions and defining a passageway connected with an opening in the ceiling, each ceiling trim member retaining an upper edge of said cover panels.

29. A utilities infeed panel as set forth in claim 28, including:

an adjustable support interconnecting said extensions to a suspended ceiling.

30. A floor-to-ceiling utilities infeed panel, comprising:

an infeed panel frame defining first and second opposite side faces;

cover panels removably mounted on said side faces to define a central space within said panel extending vertically to permit vertical routing of utilities through said central space within said infeed panel and through the ceiling;

a termination panel support member mounted to said infeed panel frame, said termination panel support member disposed within said central space, said support member having a generally S-shaped cross section formed by first and second opposed U-shaped sections, said first U-shaped section defining a vertically extending channel and including a hinge along a base wall of the U-shape to provide access to data lines positioned within said vertically extending channel; and a termination panel having a plurality of data connection ports mounted on said support member within said central space.

31. A utilities infeed panel as set forth in claim 30, wherein:

said termination panel support member includes a vertical array of data line supports.

32. A utilities infeed panel as set forth in claim 31, wherein:

said infeed panel frame defines a vertical center plane and includes a pair of horizontally spaced-apart vertical frame members defining first and second opposite side faces, and including upper and lower horizontal frame members extending between said vertical frame members and interconnecting the same, said horizontal frame members being disposed in an offset position from said center plane to define said vertically extending central space.

33. A utilities infeed panel as set forth in claim 32, wherein:

said vertical frame members each define first and second opposite side faces; and said horizontal frame members are fixed to said first opposite side faces of said vertical frame members.

34. A utilities infeed panel as set forth in claim 33, including:

at least one extension connected to said infeed frame and having an upper portion adapted to be above the ceiling, said extension including a utility support member configured to support utility lines above the ceiling.

35. A utilities infeed panel as set forth in claim 34, including:

a floor track shaped to support said infeed panel on a floor; and a support member adjustably supporting said infeed panel on said floor track.

36. A utilities infeed panel as set forth in claim 35, wherein:

said utility support member comprises an elongated horizontal member having one end fixed to said extension, with an upwardly-extending utilities-retaining member at an opposite end.

37. A utilities infeed panel as set forth in claim 36, including:

a pair of connector brackets on each opposite side edge of said infeed panel frame, said brackets including a plate with at least one opening therethrough; and fasteners extending through said openings and rigidly interconnecting said infeed panel frame to said adjacent panel frames.

38. A utilities infeed panel as set forth in claim 37, wherein:

said extensions are telescopically mounted to said vertical frame members to selectively position said utility support members to account for variations in the floor-to-ceiling spacing.

39. A utilities infeed panel as set forth in claim 38, wherein:

said extensions define opposite side faces, and including:
a pair of ceiling trim members disposed adjacent said opposite side faces of said extensions and defining a passageway therebetween adapted to be connected with an opening in the ceiling, each ceiling trim member retaining an upper edge of said cover panels.

40. A floor-to-ceiling partition wall system, comprising:

a plurality of partition panels adapted to extend from a floor height to a ceiling height, and having panel frames interconnected along opposite side edges thereof and defining opposite side faces, and having cover panels mounted on said opposite side faces of the panel frames to form a partition wall having substantially planar side surfaces;

a utilities infeed panel including:
an infeed panel frame having opposite side edges interconnected with side edges of adjacent partition panel frames and forming an integral portion of the partition wall, said infeed panel frame defining first and second opposite side faces and a vertically-extending central space adapted to be connected to an opening in the ceiling, said infeed panel frame including a pair of spaced-apart upper horizontal elongated members adapted to be positioned at said ceiling height and defining an opening therebetween adapted to be aligned with an opening in the ceiling, at least one of said upper horizontal members being removable from said infeed panel frame to permit lay-in of vertical utility lines at said ceiling height;

a first cover panel connected to said first side face; and a second cover panel removably connected to said second side face and closing off said central space, said second cover panel permitting access to said central space for utilities management upon removal of said second cover panel.

* * * * *

UNITED STATES PATENT AND TRADEMARK OFFICE
CERTIFICATE OF CORRECTION

PATENT NO. : 6,003,273
DATED : December 21, 1999
INVENTORS : Michael D. Elsholz et al.

It is certified that error appears in the above-identified patent and that said Letters Patent is hereby corrected as shown below:

Column 4, line 30;
    After "skilled in the", insert --art--.
Column 4, line 63;
    "plane" should be --plan--.
Column 6, line 12;
    "discreet" should be --discrete--.
Column 7, line 25;
    "panels frames" should be --panel frames--.
Column 10, line 37;
    "skins support members" should be --skin support members--.
Column 16, line 16;
    "adapted to be" should be --adapted to extend--;

Signed and Sealed this

Sixth Day of March, 2001

*Attest:*

NICHOLAS P. GODICI

*Attesting Officer*     *Acting Director of the United States Patent and Trademark Office*